Oct. 19, 1948.  E. G. UHL ET AL  2,451,522
ROCKET PROJECTOR
Filed Dec. 2, 1942  2 Sheets-Sheet 1
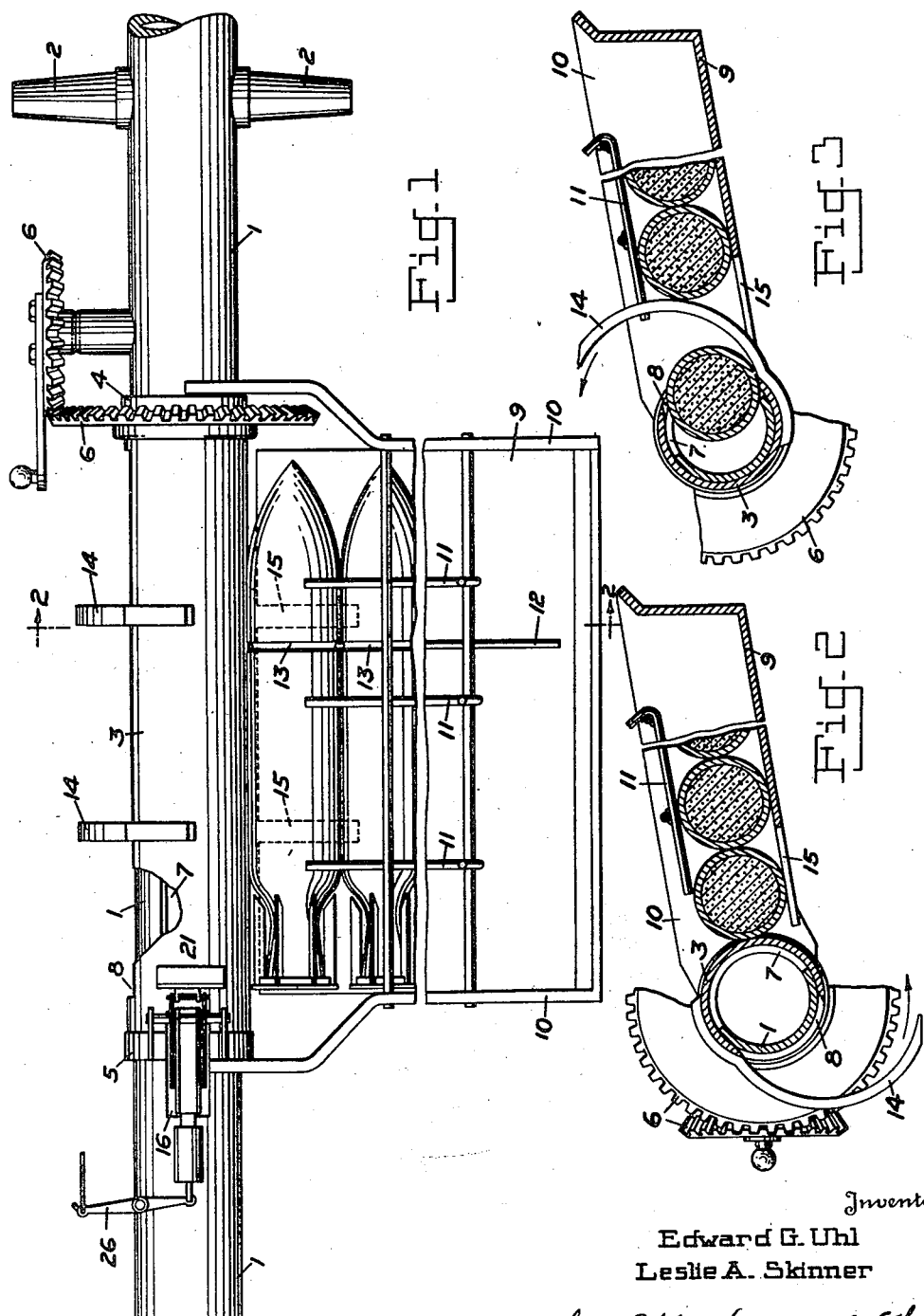
Inventors
Edward G. Uhl
Leslie A. Skinner
Attorneys

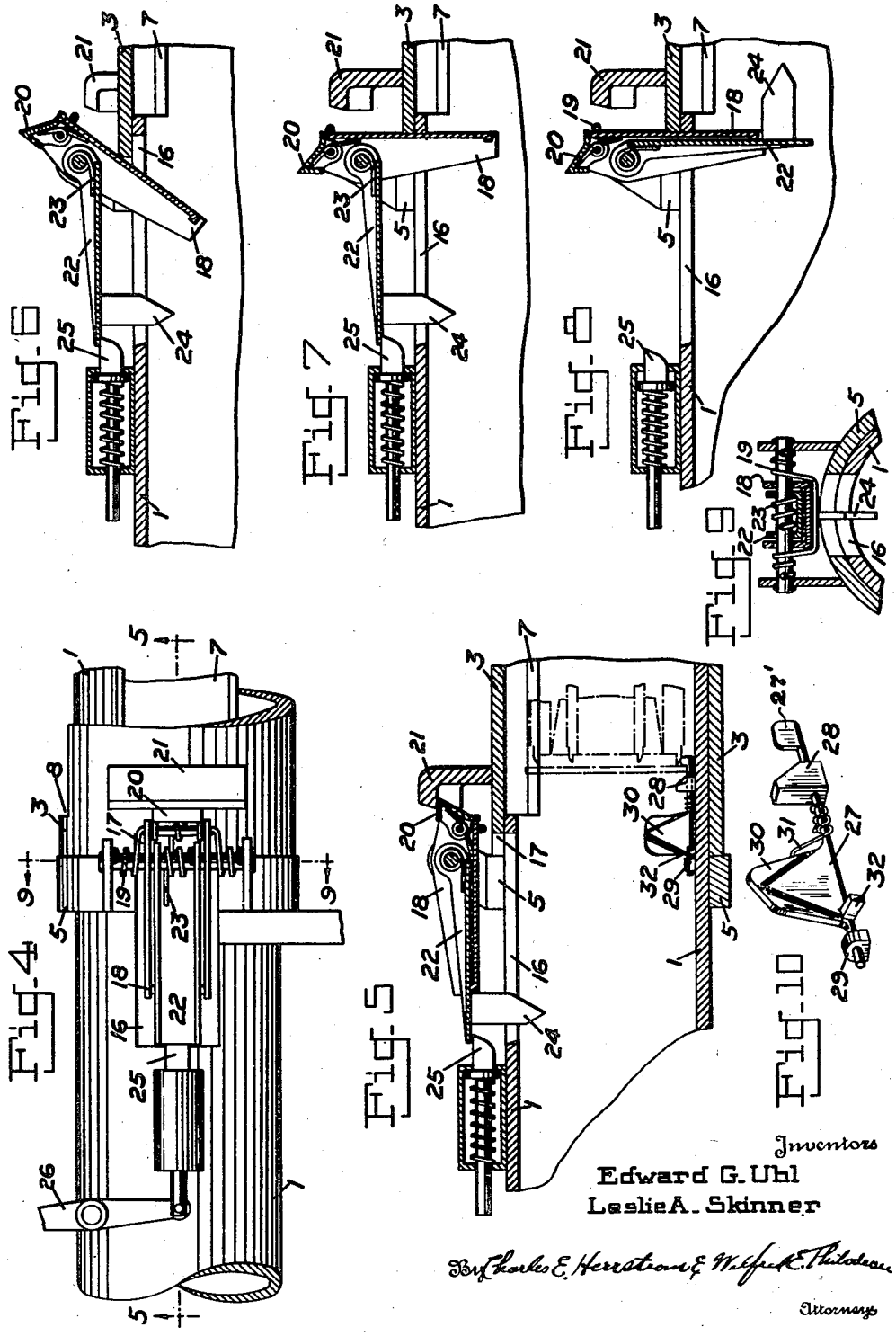

Patented Oct. 19, 1948

2,451,522

UNITED STATES PATENT OFFICE 2,451,522

ROCKET PROJECTOR

Edward G. Uhl, Elizabeth, N. J., and Leslie A. Skinner, Washington, D. C., assignors to the United States of America as represented by the Secretary of War Application December 2, 1942, Serial No. 467,660

13 Claims. (Cl. 89—1.7)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a rocket projector and more particularly to a projector adapted to successively load and fire rocket projectiles from a convenient magazine.

In the use of rockets for military purposes it has sometimes been found necessary to mount the projectors in aircraft or armored vehicles in such fashion as to deny access to the ends of the projector tube, thus barring the employment of conventional methods of rocket loading. It is therefore an object of this invention to provide a rocket projector which can be readily loaded from a point intermediate the ends thereof.

In military use of rockets it is also desirable to achieve a high concentration of fire without requiring the service of a multiplicity of projectors. It is therefore a further object of this invention to provide a rocket projector which is capable of repeating fire with positiveness and safety and which requires a minimum amount of manipulation for operation.

The specific nature of the invention as well as other objects and advantages thereof will clearly appear from a description of a preferred embodiment as shown in the accompanying drawings in which:

Fig. 1 is a top plan view of a rocket projector embodying our invention, just after firing, ready for reloading operation.

Figs. 2 and 3 are cross sectional views on the line 2—2 of Fig. 1 at different stages of the loading cycle.

Fig. 4 is an enlarged top plan view of the firing and latch mechanism.

Fig. 5 is an enlarged longitudinal sectional view of the portion of the tube supporting the firing mechanism taken on the line 5—5 of Fig. 4.

Figs. 6, 7, and 8 are partial sectional views in the same plane as Fig. 5 showing successive steps in the operation of the latch and firing mechanism.

Fig. 9 is a partial cross sectional view on the line 9—9 of Fig. 4 and

Fig. 10 is an oblique view of the rocket retaining latch.

Referring to the drawing by characters of reference the preferred embodiment shown therein comprises a tube 1 which may be supported by trunnions 2 or in any other convenient manner. At a convenient location between the ends of the tube a concentric sleeve 3 is received on the tube and supported against longitudinal displacement by a ring 4 engaging the front end thereof and by a split ring 5 engaging the rear end thereof. Gears 6 or other suitable means are provided to make it possible to rotate the sleeve on the tube. At one side of the tube 1 a rocket admitting aperture 7 is formed in the wall of the tube, and an aperture 8 of similar size is formed in the wall of the sleeve in longitudinal alignment with the aperture 7 and, by virtue of the rotational mounting of the sleeve, capable of being moved into registry with the aperture 7.

A tray or rack 9 is mounted at the side of the tube 1 in a permanent relation to the tube, and may be inclined as shown in the drawing to allow rockets to be fed toward the sleeve and the tube by gravity, or suitable spring feeding means may be employed. Preferably the tray will be formed with suitable restraining means, for example end plates 10 and top guide rails 11 to insure that the rockets will be fed in accurate alignment with the aperture in the tube 1. A bottom slide rail or rib 12 may be secured to the face of the tray in position to engage a circumferential groove 13 in the rocket casing to further assist in guiding the rockets into the tube in the proper position. Conveniently the entrance to the tray will be by way of a funnel like opening at the upper end thereof.

A pair of laterally extending curved feed arms 14 are welded or otherwise secured to the periphery of the sleeve 3 in such a manner that the tips of the arms remote from the sleeve will tend to enter from below into the space between that rocket immediately adjacent the side of the tube and the following rocket, just prior to the opening of the apertures as the sleeve is rotated about the tube. Slots 15 are provided in the tray to allow for the passage of the arms. Thus, only one rocket at a time is allowed to approach the rotating sleeve, avoiding any possibility of fouling of the fins or other elements of the rocket as the sleeve is rotated to closed position. Further, the curved arms tend to lift the rocket to be fed and discharge it into the registered apertures at an angle calculated to insure that the feeding will be positive.

Obviously it would be undesirable if it were possible for the rocket to be fired prior to complete closing of the aperture in the tube. Such firing is made practically impossible in a convenient manner by the provision of a slot 16 in the tube in alignment with the open portion of the split retaining ring 5 in rear of the sleeve. A notch 17 is provided in the rear end of the sleeve 3 and is so disposed circumferentially thereon as to register with the slot only when the solid portion of the sleeve is in closing relation to the aperture in the tube. A latch member 18 is supported from the retaining ring 5 in position for swinging movement through the slot 16 into engagement with the notch 17 in the sleeve and biased toward that position by a torsion spring 19. Obviously in any position other than that in which the aperture in the tube is closed the latch would bear against the rear end of the sleeve, but upon establishment of the alignment of notch and slot would drop into the notch to oppose further rotation of the sleeve. The latch arm is quite broad, and of a length to extend into the tube a sufficient distance (across the tube axis as shown) to be engaged by the blast of the rocket on firing and will be thereby turned about its pivot axis into a position without the tube. A detent 20 on the forward or outer end of the latch is adapted to engage beneath an abutment 21 on the sleeve to secure the latch in retracted position until the sleeve has been turned to a position in which the notch 17 no longer opposes the slot 16. At that point the abutment may be terminated and allow the latch to drop down into engagement with the rear end of the sleeve.

Preferably the firing hammer 22 is supported by the same pivot structure as that holding the latch and is engaged by a torsion spring 23 tending to throw it into position for the firing pin 24 to engage the primer in the rear end of the rocket. A sear 25 is provided to retain the hammer in locked position until released by action of the trigger lever 26. The hammer will be carried back to cocked position by the latch arm 18 under the influence of the blast from the rocket and if the trigger is not immediately released will be held in that position by the latch arm until the trigger has been released and the sleeve rotated sufficiently to release the latch arm.

One or more rocket retaining latches 27 (Figures 5 and 10) may be provided in the tube to insure that the rocket will be retained against longitudinal movement in the proper position for engagement of firing pin and primer. Preferably the latch 27 will be journaled by a fore and aft shank or shaft in lugs 28 and 29 secured to the inside of the tube 1, the forward face of the front lug 28 being at an angle to the axis of the tube 1 to cam the rocket slightly forward as the rocket falls into the tube. The guide means on the tray are desirably adjusted to drop the rocket with its flanged rear end in contact with the angling face. The forward end of the shank of the latch 27 extends a distance forwardly of the lug 28 and is formed with a bill 27' to engage before the front face of the base flange of the rocket when the latch is in initial position and to release the same by rotary movement of the latch. A vane 30 is provided on the shank of the latch in position curved so as to be engaged by the blast of the rocket and tend to rotate the latch to position to disengage from the base flange of the rocket. A spring 31 is provided tending to turn the vane into initial radial position at which a locating stop 32 on the shank of the vane engages the inner face of the tube.

To summarize the operation of the device let it be assumed that the latch and hammer are cocked as in Figures 4 and 5, and that one or more rocket projectiles are in the ammunition tray. The sleeve 3 then closes the port 7. Operation of the gears 6 results in rotation of the sleeve toward aperture opening position, during which the abutment 21 disengages from the detent 20 allowing the latch to descend against the rear end edge of the sleeve. Upon continued rotation the aperture 7 is opened and the feed arms 14 cut the lowermost rocket from the supply in the tray and load it into the tube. The rocket moves principally by gravity, rolling through the aperture 7 as in Figure 3. The rocket in falling into the tube will impinge upon the forward inclined surface of the abutment 28 and slide forward thereon into position against the latch which will positively retain the rocket against forward displacement in the event the tube is used at a depressed angle of elevation. As the sleeve arrives at a position in which the tube aperture is completely closed again, the latch arm 18 will descend into the notch 17 and lock the sleeve against further rotation as in Figure 7. It will be obvious that had the firing hammer been inadvertently released prior to that latching that the hammer could impinge upon the latch and would not fire the rocket. The rocket may be fired by operation of the trigger arm at any time after the latch descends and upon firing the blast of gas will recock the hammer and engage the detent 20 with the sleeve abutment, holding the latch elevated as in Figure 5, while the latch vane 30 will simultaneously rotate the rocket retaining latch into releasing position. As has been heretofore pointed out the latch arm will hold the hammer in cocked position until the sleeve is rotated by which time the sear will have been certainly released and the tip of the hammer will move over the sear. In no event can the hammer contact the primer of the rocket until the sleeve has been secured in tube closing relation by descent of the latch into notch 17. The cycle can then be repeated as long as ammunition is supplied to the tray.

It should be realized that the practice of the invention is by no means limited to the embodiment specifically shown herein as modifications therein will be at once apparent to those skilled in the art. For example, the percussion firing means shown could be replaced by electrical means in which the firing member could carry an electrical contact into engagement with a suitable contact in the base of the rocket.

We claim:

1. A rocket projector comprising a tube, a rotatable sleeve movable on said tube between the ends thereof, apertures in said tube and said sleeve capable of being aligned with each other to allow a rocket to be admitted to the tube, means to rotate said sleeve to a position in which the apertures are out of alignment whereby the aperture in said tube is closed, and loading means on the sleeve extending exteriorly before the sleeve aperture in a direction to engage outwardly of a rocket beside the tube and cam the rocket into the aperture of the tube as the sleeve uncovers and closes the tube aperture.

2. A rocket projector comprising a tube, an aperture in the tube between the ends thereof and capable of admitting a rocket to the tube, a rotatable concentric sleeve surrounding the tube in the apertured zone of the tube, an aperture in the sleeve capable of being aligned with the first aperture at one position of the sleeve and shaped and proportioned to pass a rocket, means to rotate said sleeve about said tube, and rocket feeding means on the sleeve extended outwardly therefrom in a form to engage and feed a rocket into said tube when the apertures in tube and sleeve are in registry with each other under movement of the sleeve to open and close the tube aperture.

3. A rocket projector as described in claim 2, and a feed tray fixed with said tube and capable of positioning a plurality of rockets in position to be progressively engaged by the feeding means.

4. A rocket projector as described in claim 2, rocket engaging firing means mounted on the tube and constructed to fire a rocket loaded in the tube by moving into engagement therewith, and means on the tube in controlled relation to the sleeve normally in stopping relation to the firing means operatively engaged with the sleeve to move to clearing position when the sleeve is rotated to position to completely close the aperture in the tube.

5. A rocket projector as described in claim 2, said feeding means comprising a pair of curved feed arms secured to the sleeve and extending laterally from an edge of the aperture in the sleeve, said arms being adapted to receive and cradle a rocket positioned beside the tube and move it, as the sleeve is rotated, into and through the registered apertures.

6. A rocket projector as described in claim 2, said feeding means comprising a pair of curved feed arms secured to the sleeve and extending laterally from a side edge of the aperture in the sleeve, tray means adapted to feed rockets toward the side of the tube and sleeve in alignment with the apertures, and openings in said tray means through which the curved arms may pass in rotating with the sleeve whereby the arms may carry a rocket from the tray into the registered apertures.

7. A rocket projector as described in claim 2, said feeding means comprising a tray beside the tube positioned to guide rockets toward the side of the tube and sleeve in alignment with the apertured zones therein, the said feeding means comprising a member on the sleeve constructed to enter between a rocket next to the tube and a next rocket outward thereof in the tray when the apertures are in alignment.

8. A rocket projector comprising a tube, an aperture in the tube between the ends thereof and capable of admitting a rocket thereinto, a concentric sleeve surrounding the tube in the apertured zone of the tube, a solid portion of the sleeve capable of being brought into registry with the aperture in the tube to close said aperture, firing means for a rocket, and movable safety means between the rocket firing means and the rocket position, movable to clearing position under movement of said sleeve to aperture closing position.

9. A rocket projector as described in claim 8, said firing means comprising a member mounted to swing into the tube in position to engage the base of the rocket.

10. A rocket projector as described in claim 8, wherein said movable safety means is a latch mounted on said tube and swingable through a slot therein and a notch in said sleeve which is in alignment with said slot to receive the latch to swing into the tube to full clearing position only when the sleeve is in aperture closing position.

11. A rocket projector as described in claim 8, a slot in the tube, a notch in the sleeve which is in alignment with the slot only when said sleeve is in aperture closing relation, said firing means comprising a member adapted to swing through said slot into engagement with the base of the rocket, and said movable safety means comprising a latch adapted to swing through said slot into said notch only when the slot and notch are in alignment, said latch in position to stop complete movement of said firing means except when the latch is seated in the notch.

12. Means to retain a rocket having a flanged rear end in a projector tube comprising a lug in said tube to oppose rearward movement of the rocket flange, a rotary latch journaled in the lug and engaging the front face of the flange, and a curved vane on the rear end of said latch in position to be engaged by the rocket blast whereby the latch is turned out of engagement with said flange.

13. The structure of claim 8, wherein said safety means is a latch mounted on said tube and swingable through a slot therein and a notch in said sleeve which is in alignment with said slot when the sleeve is in aperture closing position to permit the latch to swing into the tube to clear the firing means, said sleeve having parts at each side of the notch movable over the slot to engage and hold the latch in position to block the firing means, said latch being broad enough to be moved by a rocket blast to full retracted and inoperative position, and a detent device including a part on the sleeve operative at aperture closing position of the latter to engage and hold the latch retracted, but in disengaged condition at other positions of the sleeve than the one with the slot and notch aligned.

EDWARD G. UHL.
LESLIE A. SKINNER.

REFERENCES CITED

The following references are of record in the file of this patent:

UNITED STATES PATENTS

| Number | Name | Date |
| --- | --- | --- |
| 1,152,447 | Sproull | Sept. 7, 1915 |
| 1,314,801 | Hanzlik | Sept. 2, 1919 |
| 1,349,350 | Tunks | Aug. 10, 1920 |
| 1,446,388 | Ludorf | Feb. 20, 1923 |
| 1,661,091 | Riabouchinski | Feb. 28, 1928 |